United States Patent [19]
Padovani

[11] Patent Number: 5,937,019
[45] Date of Patent: Aug. 10, 1999

[54] METHOD AND APPARATUS FOR RELIABLE INTERSYSTEM HANDOFF IN A CDMA SYSTEM

[75] Inventor: Roberto Padovani, San Diego, Calif.

[73] Assignee: QUALCOMM Incorporated, San Diego, Calif.

[21] Appl. No.: 08/695,241

[22] Filed: Aug. 7, 1996

[51] Int. Cl.[6] .................................................. H04L 7/700
[52] U.S. Cl. ........................................ 375/358; 455/438
[58] Field of Search .................................... 375/356, 358, 375/259, 227; 455/436–438, 439, 437; 370/522, 525, 335, 331

[56] References Cited

U.S. PATENT DOCUMENTS

| | | | |
|---|---|---|---|
| 5,267,261 | 11/1993 | Blakeney, II et al. | 375/1 |
| 5,313,489 | 5/1994 | Menich et al. | 375/1 |
| 5,345,467 | 9/1994 | Lomp et al. | 375/1 |
| 5,367,533 | 11/1994 | Schilling | 375/1 |
| 5,412,658 | 5/1995 | Arnold et al. | 370/69.1 |
| 5,422,933 | 6/1995 | Barnett et al. | 455/439 |
| 5,434,798 | 7/1995 | Madebrink et al. | 455/445 |
| 5,448,754 | 9/1995 | Ho et al. | 455/34.1 |
| 5,541,978 | 7/1996 | Brunner et al. | 455/437 |
| 5,682,380 | 10/1997 | Park et al. | 455/436 |
| 5,682,416 | 10/1997 | Schmidt et al. | 455/436 |
| 5,697,055 | 12/1997 | Gilhousen et al. | 455/436 |
| 5,790,528 | 8/1998 | Muszynski | 455/443 |
| 5,805,995 | 9/1998 | Jaing et al. | 455/436 |

FOREIGN PATENT DOCUMENTS

| | | | |
|---|---|---|---|
| 9603845 | 2/1996 | WIPO | H04Q 7/38 |
| 961238 | 4/1996 | WIPO | H04Q 7/38 |
| 9612380 | 4/1996 | WIPO | H04Q 7/38 |
| 9631078 | 10/1996 | WIPO | H04Q 7/38 |

OTHER PUBLICATIONS

Alejandro R. Holcman et al., "CDMA Intersystem Operations", *IEEE*, Jun. 8, 1994, pp. 590–594.

Primary Examiner—Tesfaldet Bocure
Attorney, Agent, or Firm—Russell B. Miller; Bruce W. Greenhaus; Kent D. Baker

[57] ABSTRACT

In a communications network, a network user communicates through a remote unit via at least one base station. The communications network includes a first mobile switching center for controlling communications through a first set of base stations and a second mobile switching center for controlling communications through a second set of base stations. The network also includes a service providing base station controlled by the first mobile switching center and providing service to a first transition coverage area using a first pseudorandom noise code. The first transition coverage area defines a boundary between a first system controlled by the first mobile switching center and a second system controlled by the second mobile switching center. The network further includes a passage providing base station controlled by the second mobile switching center for providing service to the first transition area using a second pseudorandom noise code offset in time by a first amount from the first pseudorandom noise code. The passage providing base station provides service to a remote unit only if the remote unit is entering the first transition coverage area while exiting the second system or is about to exit the first transition coverage area while entering the second system.

9 Claims, 4 Drawing Sheets

METHOD AND APPARATUS FOR RELIABLE INTERSYSTEM HANDOFF IN A CDMA SYSTEM

BACKGROUND OF THE INVENTION

1. Field of the Invention

The present invention relates generally to cellular communications systems. More particularly, the present invention relates to a novel and improved technique for handing off communication between base stations of different cellular systems.

2. Description of the Related Art

The use of code division multiple access (CDMA) modulation techniques is but one of several techniques for facilitating communications in which a large number of system users are present. Although other techniques such as time division multiple access (TDMA), and frequency division multiple access (FDMA) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated herein by reference.

In the just mentioned patent, a multiple access technique is disclosed in which a large number of mobile telephone system users, each having a transceiver (also known as a remote unit), communicate through satellite repeaters or terrestrial base stations (also known as base stations or cell-sites) using CDMA spread spectrum communication signals. In using CDMA communications, the frequency spectrum can be reused multiple times. The use of CDMA techniques results in a much higher spectral efficiency than can be achieved using other multiple access techniques thus permitting an increase in system user capacity.

The conventional FM cellular telephone systems used within the United States is commonly called the Advanced Mobile Phone Service (AMPS), and is detailed in Electronic Industry Association standard EIA/TIA-553 "Mobile Station—Land Station Compatibility Specification". In such a conventional FM cellular telephone system, the available frequency band is divided into channels typically 30 Kilo Hertz (kHz) in bandwidth. The system service area is divided geographically into base station coverage areas which may vary in size. The available frequency channels are divided into sets. The frequency sets are assigned to the coverage areas in such a way as to minimize the possibility of co-channel interference. For example, consider a system in which there are seven frequency sets and the coverage areas are equally sized hexagons. The frequency set used in one coverage area is not used in the six nearest neighboring coverage areas.

In conventional cellular systems, a handoff scheme is used to allow a communication connection to continue when a remote unit crosses the boundary between coverage areas of two different base stations. In the AMPS system, the handoff from one base station to another is initiated when the receiver in the active base station handling the call notices that the received signal strength from the remote unit has fallen below a predetermined threshold value. A low signal strength indication implies that the remote unit must be near the coverage area boundary of the base station. When the signal level falls below the predetermined threshold value, the active base station asks the system controller to determine whether a neighboring base station receives the remote unit signal with better signal strength than the current base station.

The system controller in response to the active base station inquiry sends messages to the neighboring base stations with a handoff request. Each of the base stations neighboring the active base station employs a special scanning receiver which looks for the signal from the remote unit on the channel at which it is operating. Should one of the neighboring base stations report an adequate signal level to the system controller, a handoff is attempted to that neighboring base station which is now labeled the target base station. Handoff is then initiated by selecting an idle channel from the channel set used in the target base station. A control message is sent to the remote unit commanding it to switch from the current channel to the new channel supported by the target base station. At the same time, the system controller switches the call connection from the active base station to the target base station. This process is referred to as hard handoff. The term hard is used to characterize the 'break-before-make' characteristic of the handoff.

In the conventional system a call connection is dropped (i.e. discontinued) if the handoff to the target base station is unsuccessful. There are many reasons that a hard handoff failure may occur. Handoff can fail if there is no idle channel available in the target base station. Handoff can also fail if one of the neighboring base stations reports receiving a signal from the remote unit, when in fact the base station actually is receiving a different remote unit signal using the same channel to communicate with a distant base station. This reporting error results in the transfer of the call connection to a wrong base station, typically one in which signal strength from the actual remote unit is insufficient to maintain communications. Furthermore, should the remote unit fail to receive the command to switch channels, the handoff fails. Actual operating experience indicates that handoff failures occur frequently which significantly lowers the reliability of the system.

Another common problem in the conventional AMPS telephone system occurs when the remote unit remains for an extended period of time near the border between two coverage areas. In this situation the signal level tends to fluctuate with respect to each base station as the remote unit changes position or as other reflective or attenuative objects within the coverage area change position. The signal level fluctuations can result in a "ping-ponging" situation in which repeated requests are made to handoff the call back and forth between the two base stations. Such additional unnecessary handoffs increase the probability that the call is inadvertently discontinued. In addition, repeated handoffs even if successful can adversely effect signal quality.

In U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", issued Mar. 31, 1992, which is assigned to the assignee of the present invention, a method and system are disclosed for providing communication with the remote unit through more than one base station during the handoff of a CDMA call. Using this type of handoff communication within the cellular system is uninterrupted by the handoff from the active base station to the target base station. This type of handoff may be considered as a "soft" handoff in that concurrent communications is established with the target base station which becomes a second active base station before communication with the first active base station is terminated.

An improved soft handoff technique is disclosed within U.S. Pat. No. 5,267,261, entitled "MOBILE STATION ASSISTED SOFT HANDOFF IN A CDMA CELLULAR COMMUNICATIONS SYSTEM", issued Nov. 30, 1993, hereinafter referred to as the '261 patent, which is also assigned to the assignee of the present invention. In the system of the '261 patent, the soft handoff process is controlled based on measurements at the remote unit of the strength of "pilot" signals transmitted by each base station within the system. These pilot strength measurements assist the soft handoff process by facilitating identification of viable base station handoff candidates.

Remote unit assisted soft handoff operates based on the pilot signal strength of several sets of base stations as measured by the remote unit. The Active Set is the set of base stations through which active communication is established. The Neighbor Set is a set of base stations surrounding an active base station comprising base stations that have a high probability of having a signal strength of sufficient level to establish communication. The Candidate Set is a set of base stations having a pilot signal strength at a sufficient signal level to establish communication. The Remaining Set is a set of base station which are not members of the Active, Candidate, or Neighbor set.

When communications are initially established, a remote unit communicates through a first base station and the Active Set contains only the first base station. The remote unit monitors the pilot signal strength of the base stations of the Active Set, the Candidate Set, and the Neighbor Set. When a pilot signal of a base station in the Neighbor Set exceeds a predetermined threshold level, T_ADD, the base station is added to the Candidate Set and removed from the Neighbor Set at the remote unit. The remote unit communicates a message to the first base station identifying the new base station. The system controller decides whether to establish communication between the new base station and the remote unit. Should the system controller decide to do so, the system controller sends a message to the new base station with identifying information about the remote unit and a command to establish communications therewith. A message is also transmitted to the remote unit through the first base station. The message identifies a new Active Set that includes the first and the new base stations. The remote unit searches for the new base station transmitted information signal and communication is established with the new base station without termination of communication through the first base station. This process can continue with additional base stations.

When the remote unit is communicating through multiple base stations, it continues to monitor the signal strength of the base stations of the Active Set, the Candidate Set, and the Neighbor Set. Should the signal strength corresponding to a base station of the Active Set drop below a predetermined threshold, T_DROP, for a predetermined period of time, T_TDROP, the remote unit generates and transmits a message to report the event. The system controller receives this message through at least one of the base stations with which the remote unit is communicating. The system controller may decide to terminate communications through the base station having a weak pilot signal strength.

The system controller upon deciding to terminate communications through a base station generates a message identifying a new Active Set of base stations. The new Active Set does not contain the base station through which communication is to be terminated. The base stations through which communication is established send a message to the remote unit. The system controller also communicates information to the base station to terminate communications with the remote unit. The remote unit communications are thus routed only through base stations identified in the new Active Set.

The message sent from the remote unit to the base station comprising the pilot signal information of the members of the Candidate and Active Sets is referred as a Pilot Strength Measurement Message (PSMM). A PSMM is sent by the remote unit either in response to a request from the base station or because the signal strength of a base station of the Neighbor Set has exceeded a threshold, or the signal strength of a base station in the Candidate Set has exceeded the strength of one of the base stations of the Active Set by a predetermined amount, or the signal strength corresponding to a base station of the Active Set drop below a predetermined threshold, T_DROP, for a predetermined period of time, T_TDROP.

Four parameters control the soft handoff process. First, the pilot detection threshold, T_ADD, specifies the level which the pilot signal strength of a base station which is a member of the Neighbor Set must exceed to become classified as a member of the Candidate Set. The pilot drop threshold, T_DROP, specifies the level below which the pilot signal strength of a base station which is a member of the Active or Candidate Set must fall in order to trigger a timer. The duration of the triggered timer is specified by T_TDROP. After the time specified by T_TDROP has passed, if the pilot signal strength is still below the T_DROP level, the remote unit initiates removal of the corresponding base station from the set to which it currently belongs. The Active Set versus Candidate Set comparison threshold, T_COMP, sets the amount by which the pilot signal strength of a member of the Candidate Set must exceed the pilot signal strength of a member of the Active Set to trigger a PSMM. Each of these four parameters is stored in the remote unit. Each of these four parameters can be reprogrammed to a new value by a message sent from a base station.

Although the foregoing techniques are well-suited for call transfers between base stations in the same cellular system which are controlled by the same system controller, a more difficult situation is presented by movement of the remote unit into a coverage area serviced by a base station controlled by a different controller. When a handoff must be made between base station controlled by different controllers, the handoff is called an intersystem handoff. One complicating factor in such intersystem handoffs is that typically there is no direct link between the base stations of the first system and the system controller of the second system and vice versa. The two systems are thereby precluded from performing simultaneous remote unit communication through more than one base station during the handoff process. Even when the existence of an intersystem link between the two systems is available to facilitate intersystem soft handoff, often dissimilar characteristics of the two systems further complicate the soft handoff process.

When resources are not available to conduct intersystem soft handoffs, the execution of a "hard" handoff of a call connection from one system to another becomes critical if uninterrupted service is to be maintained. The intersystem handoff must be executed at a time and location likely to result in successful transfer of the call connection between systems. It follows that the handoff should be attempted only when, for example:

(i) an idle channel is available in the target base station, (ii) the remote unit is within range of the target base station and the active base station, and (iii) the remote unit is in a position at which it is assured of receiving the command to switch channels.

Ideally, each such intersystem hard handoff should be conducted in a manner which minimizes the potential for "ping-ponging" handoff requests between the base stations of different systems.

These and other shortcomings of existing intersystem handoff techniques impair the quality of cellular communications, and may be expected to further degrade performance as competing cellular systems continue to proliferate. Accordingly, there is a resulting need for an intersystem handoff technique capable of reliably executing the handoff of a call between the base stations of different systems.

SUMMARY OF THE INVENTION

The present invention uses two collocated base stations to facilitate hard handoff from a first base station controlled by a first system controller to a second base station controlled by a second system controller. Both base stations provide substantially the same coverage area, therefore, a hard handoff from one to the other is predictably reliable anywhere within the coverage area. The two base stations use PN codes offset from one another by a predetermined amount so that the remote units in the common coverage area can distinguish the two signals. In order to reduce the amount of co-interference between the base stations, one of the two base stations is designated as the service-providing base station and the other is designated the passage-providing base station. The service-providing base station provides service to the majority of remote units within the coverage area. The passage-providing base station is used to transition remote units from one system to the other. Only those remote units which are entering the common coverage area from the system controlled by the controller which controls the passage-providing base station and those remote units which are about to exit the common coverage area and enter the system controlled by the controller which controls the passage-providing base station receive service through the passage-providing base station. All other remote units receive service through the service-providing base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DESCRIPTION OF THE PREFERRED EMBODIMENT

Figure 1:
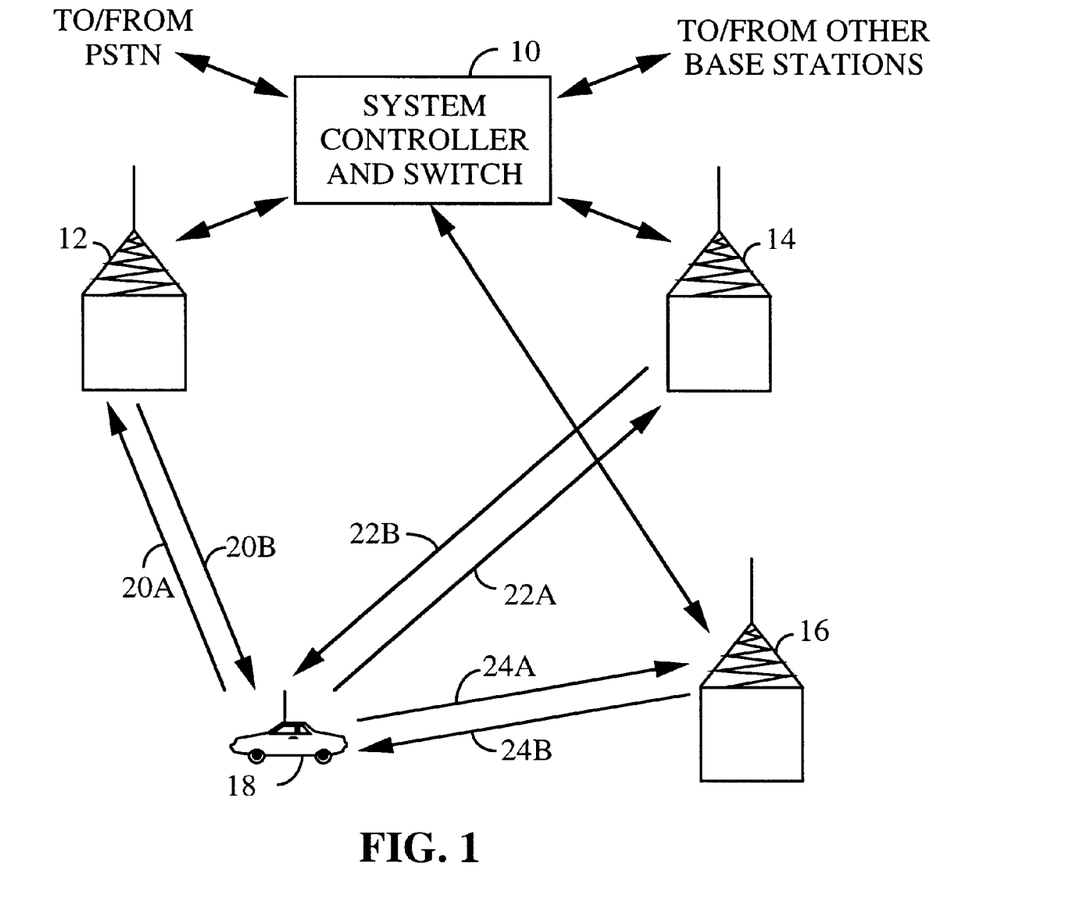
FIG. 1 provides an exemplary illustration of a cellular WLL, PCS or wireless PBX system.

An exemplary illustration of a cellular telephone system, a wireless private branch exchange (PBX) system, a wireless local loop (WLL), personal communication system (PCS) system, dispatch system or other analogous wireless communication system is shown in FIG. 1. In an alternative embodiment, the base stations of FIG. 1 may be satellite based or airborne. The system illustrated in FIG. 1 may use various multiple access modulation techniques for facilitating communications between a large number of remote units and a plurality of the base stations. A number of multiple access communication system techniques, such as time division multiple access (TDMA), frequency division multiple access (FDMA), and code division multiple access (CDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference. Many of the ideas described herein can be used with a variety of communication techniques even though the preferred embodiments disclosed herein are described with reference to a CDMA system.

In using CDMA communications, the same frequency spectrum can be used by a plurality of units to communicate a plurality of distinct communication signals. The use of CDMA results in a much higher spectral efficiency than can be achieved using other multiple access techniques thus permitting an increase in system user capacity.

In the typical CDMA system, each base station transmits a unique pilot signal. In the preferred embodiment, the pilot signal is an unmodulated, direct sequence, spread spectrum signal transmitted continuously by each base station using a common pseudorandom noise (PN) spreading code. Each base station or base station sector transmits the common pilot sequence offset in time from the other base stations. A remote unit can identify a base station based on the code phase offset of the pilot signal that it receives from the base station. The pilot signal also provides a phase reference for coherent demodulation and the basis of the signal strength measurements used in handoff determination.

Referring again to FIG. 1, system controller and switch 10, also referred to as a mobile switching center (MSC), typically includes interface and processing circuitry for providing system control to the base stations. Controller 10 also controls the routing of telephone calls from the public switched telephone network (PSTN) to the appropriate base station for transmission to the appropriate remote unit. Controller 10 also controls the routing of calls from the remote units, via at least one base station to the PSTN. Controller 10 may direct calls between remote units via the appropriate base stations.

A typical wireless communication system contains some base stations having multiple sectors. A multi-sectored base station comprises multiple independent transmit and receive antennas as well as some independent processing circuitry. The present invention applies equally to each sector of a sectorized base station and to single sectored independent base stations. The term base station can be assumed to refer to either a sector of a base station or a single sectored base station.

Controller 10 may be coupled to the base stations by various means such as dedicated telephone lines, optical fiber links or by microwave communication links. FIG. 1 illustrates exemplary base stations 12, 14, and 16 and exemplary remote unit 18. Remote unit 18 may be a vehicle based telephone, a hand-held portable unit, a PCS unit, a dispatch net unit, or a fixed location wireless local loop unit or any other conforming voice or data communication device. Arrows 20A–20B illustrate the possible communication link between base station 12 and remote unit 18. Arrows 22A–22B illustrate the possible communication link between base station 14 and remote unit 18. Similarly, arrows 24A–24B illustrate the possible communication link between base station 16 and remote unit 18.

The base station locations are designed to provide service to remote units located within their coverage areas. When the remote unit is idle, i.e. no call is in progress, the remote unit constantly monitors the pilot signal transmissions from each nearby base station. As illustrated in FIG. 1 the pilot signals are transmitted to remote unit 18 by base stations 12, 14, and 16 upon communication links 20B, 22B, and 24B, respectively. Generally speaking, the term forward link refers to the connection from the base station to the remote unit. Generally speaking, the term reverse link refers to the connection from the remote unit to the base station.

In the example illustrated in FIG. 1, remote unit 18 may be considered to be in the coverage area of base station 16. As such remote unit 18 tends to receive the pilot signal from base station 16 at a higher level than any other pilot signals it monitors. When remote unit 18 initiates a traffic channel communication (e.g. a telephone call), a control message is transmitted to base station 16 from remote unit 18. Base station 16, upon receiving the call request message, signals controller 10 and transfers the called telephone number. Controller 10 then connects the call through the PSTN to the intended recipient.

Should a call be initiated from the PSTN, controller 10 transmits the call information to a set of base stations located in proximity to the location at which the remote unit most recently registered its presence. The base stations in return broadcast a paging message. When the intended remote unit receives its page message, it responds with a control message that is transmitted to the nearest base station. The control message notifies controller 10 that this particular base station is in communication with the remote unit. Controller 10 initially routes the call through this base station to the remote unit.

Should remote unit 18 move out of the coverage area of the initial base station for example, base station 16, communication is transferred to another base station. The process of transferring the communication to another base station is referred to as handoff. In the preferred embodiment, the remote unit initiates and assists the handoff process.

In accordance with the "Mobile Station-Base Station Compatibility Standard for Dual-Mode Wideband Spread Spectrum Cellular System," TIA/EIA/IS-95, generally referred to simply as IS-95, a "remote unit-assisted" handoff may be initiated by the remote unit itself. The remote unit is equipped with a search receiver which is used to scan for the pilot signal transmission of neighboring base stations in addition to performing other functions. If a pilot signal of one of the neighboring base stations, for example base station 12, is found to be stronger than a given threshold, remote unit 18 transmits a message to the current base station, base station 16. The information is communicated via base station 16 to controller 10. Controller 10 upon receiving this information may initiate a connection between remote unit 18 and base station 12. Controller 10 requests that base station 12 assign resources to the call. In the preferred embodiment, base station 12 assigns a channel element to process the call and reports such assignment back to controller 10. Controller 10 informs remote unit 18 through base station 16 to search for a signal from base station 12 and informs base station 12 of the remote unit traffic channel parameters. Remote unit 18 communicates through both base stations 12 and 16. During this process the remote unit continues to identify and measure the signal strength of the pilot signals which it receives. In this way, remote unit assisted soft handoff is achieved.

The foregoing process may also be considered to be a "soft" handoff in that the remote unit simultaneously communicates through more than one base station. During a soft handoff, the controller can combine or choose between the signals received from each base station with which the remote unit is in communication. The controller relays signals from the PSTN to each base station with which the remote unit is in communication. The remote unit combines the signals it receives from each base station to produce an aggregate result. Remote unit-assisted handoffs tend to be more complex if the remote unit happens to be located within the coverage area of two or more base stations which are not within the same cellular system, i.e., which are not controlled by the same controller.

Figure 2:
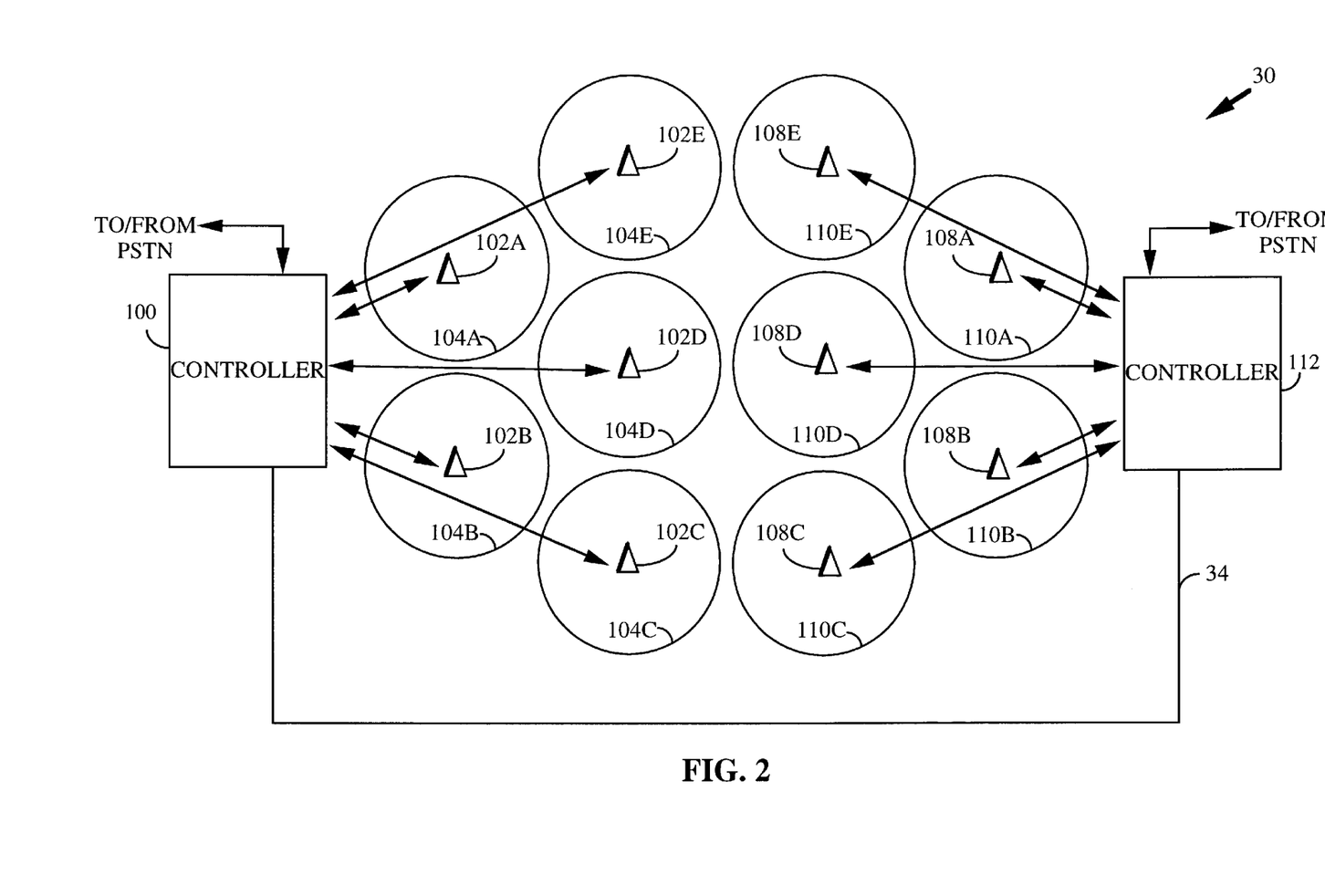
FIG. 2 shows a cellular communications network comprised of a first and second cellular system.

FIG. 2 shows a cellular communications network 30 comprising first and second cellular systems under the control of first and second controllers 100 and 112, respectively. Controllers 100 and 112 are respectively coupled to the base stations of the first and second cellular systems by various means such as dedicated telephone lines, optical fiber links or by microwave communication links. In FIG. 2, there are five exemplary base stations 102A–102E respectively providing coverage areas 104A–104E of the first system, and five base stations 108A–108E respectively providing coverage areas 110A–110E of the second cellular system.

For convenience of illustration, coverage areas 104A–104E and coverage areas 110A–110E of FIG. 2, and the coverage areas shown in FIG. 4 subsequently introduced herein, are shown as being circular or hexagonal and are highly idealized. In the actual communication environment, base station coverage areas may vary in size and shape. Base station coverage areas tend to overlap defining coverage area shapes different from the ideal circular or hexagonal shape. Furthermore, base stations may also be sectored such as into three sectors, as is well known in the art.

In what follows coverage areas 104C–104E and coverage areas 110C–110E may be referred to as border or transition coverage areas because these coverage areas are proximate the boundary between the first and second cellular systems. The remainder of the coverage areas within each system are referred to as internal or interior coverage areas.

A quick examination of FIG. 2 reveals that controller 112 does not have direct access to communicate with base stations 102A–102E and controller 100 does not have direct access to communicate with base stations 108A–108E. As shown in FIG. 2 controllers 100 and 112 can communicate with one another. For example, EIA/TIA/IS-41 entitled "Cellular Radio Telecommunication Intersystem Operations," and subsequent revision thereof, define a standard for communication between switches of different operating regions as shown by intersystem data link 34 in FIG. 2. To provide soft handoff between one of base stations 102A–102E and one of base stations 108A–108E, call signal and power control information has to pass between controllers 100 and 112. The nature of the controller-to-controller connection may not support the transfer of such data. Also, the architecture of the system controlled by controller 100 and the system controlled by controller 112 may be different. Therefore, the present invention relates to providing a mechanism of hard handoff between two systems where soft handoff is not available.

The remote unit is programmed to monitor the pilot signal transmissions from a set of neighboring base stations. Consider a case in which the remote unit is located within coverage area 104D but is approaching coverage area 110D. In this situation, if the remote unit begins to receive usable signal levels from base station 108D, this event is reported to base station 102D and to any other base station(s) with which the remote unit is currently in communication. The receipt of usable signal levels by a remote unit may be determined by measuring one or more quantifiable parameters such as signal strength, signal to noise ratio, frame error rate, frame erasure rate, bit error rate, and/or relative time delay of the received signal. In the preferred embodiment, the measurement is based on the pilot signal strength as received by the remote unit. After detection of usable receive signal levels at the remote unit and the reporting thereof to base station 102D using a signal strength message, a same frequency remote unit-assisted hard handoff from base station 102D to base station 108D may then proceed as follows:

(i) Base station 102D relays the remote unit's reported signal level received from base station 108D to controller 100 which is aware that base station 108D is controlled by controller 112;

(ii) Controller 100 requests channel resources and intersystem trunk facilities between the two systems from base station 108D through controller 112 and over intersystem data link 34;

(iii) Controller 112 responds to the request by furnishing information to controller 100, via intersystem data link 34, which identifies the channel on which communication is to be established as well as other information. In addition, the controller reserves within base station 108D the designated channel for communication with the remote unit and the trunk resources;

(iv) Controller 100 supplies the new channel information to the remote unit via base station 102D, and specifies a time at which the remote unit is to begin communication with base station 108D;

(v) Communication is established via hard handoff between the remote unit and base station 108D at the specified time; and (vi) Controller 112 acknowledges to controller 100 the successful transition of the remote unit into the system.

One difficulty with this approach is that base station 108D may not as yet be receiving a usable signal level from the remote unit. For this or other reasons generally associated with hard handoff, the call connection may be dropped during the process of transferring control to controller 112. If the call connection is dropped, an error message rather than an acknowledgment is sent from controller 112 to controller 100.

Figure 3A:
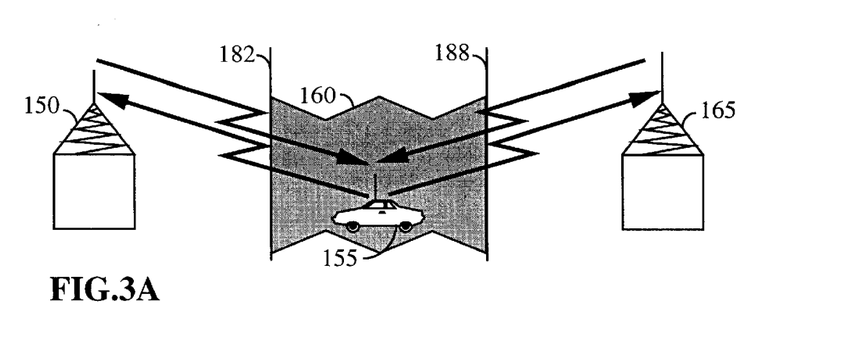
FIG. 3A show a highly idealized representation of the hard handoff region of an FM system.

Another difficulty in providing for hard handoff is the nature of the coverage area boundaries of the CDMA system. In an FM system, such as AMPS, the coverage area overlap regions are rather broad. The coverage area overlap region is the area in which communication can be supported between a remote unit and either one of two different base stations alone. In an FM system such coverage areas overlap regions must be broad because hard handoffs may only occur successfully when the remote unit is located in a coverage area overlap region. For example, FIG. 3A is a highly idealized representation of an FM system. Base station 150 and base station 165 are capable of providing forward and reverse link FM communication to remote unit 155. (The forward link refers to the connection from the base station to the remote unit. The reverse link refers to the connection from the remote unit to the base station.) Within region 160, the signal strength from both base station 150 and base station 165 is a sufficient level to support communication with remote unit 155. Note that due to the nature of the FM system, base stations 150 and 165 cannot communicate simultaneously with remote unit 155. When a hard handoff from base station 150 to base station 165 occurs within region 160, a new frequency is used for the communication between base station 165 and remote unit 155 than was used between base station 150 and remote unit 155. Base station 165 never transmits on any frequency used by base station 150 and thus base station 165 provides nominally no interference to the communication between base station 150 and any remote unit with which it is in communication. Boundary 182 indicates the location beyond which communication from base station 165 to remote unit 155 is not possible. Likewise boundary 188 indicates the location beyond which communication from base station 150 to remote unit 155 is not possible. Obviously FIG. 3A, as well as FIG. 3B, is not drawn to scale and in reality the coverage area overlap regions are relatively narrow as compared to the total coverage area of each base station.

With the CDMA soft handoff, the existence of a coverage area overlap region in which communication may be supported completely by just one of two base stations is not critical. In the region where soft handoff occurs, it is sufficient that reliable communication may be maintained if communication is established simultaneously with two or more base stations. In the CDMA system, typically the active and neighbor base stations operate at the same frequency. Thus, as the remote unit approaches a coverage area of a neighbor base station, the signal levels from active base station fall and the interference levels from the neighbor base station increase. Because of the increasing interference from the neighbor base station, if soft handoff is not established, the connection between the active base station and the remote unit may become jeopardized. The connection is especially jeopardized if the signal fades with respect to the active base station and not with respect to the neighbor base station.

Figure 3B:
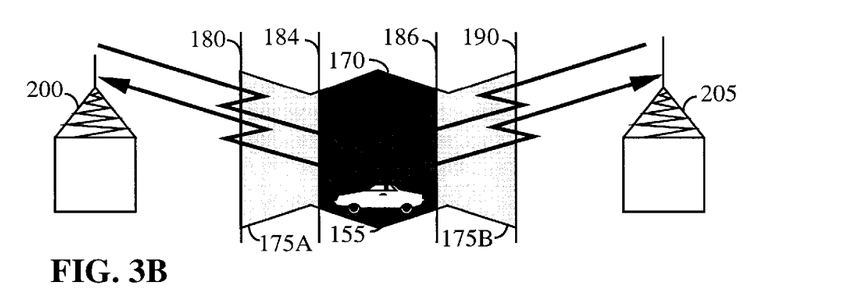
FIG. 3B show a highly idealized representation of the hard and soft handoff regions of a CDMA system.

FIG. 3B is a highly idealized representation of a CDMA system. CDMA base station 200 and CDMA base station 205 are capable of providing forward and reverse link CDMA communication to remote unit 155. Within darkest region 170, the signal strength from both base station 200 and base station 205 is sufficient to support communication with remote unit 155 even if communication is established with only one of base station 200 or base station 205. Beyond boundary 184, communication through only base station 205 is not reliable. Likewise beyond boundary 186 communication through only base station 200 is not reliable.

Regions 175A, 170, and 175B represent the areas in which it is likely that a remote unit is in soft handoff between base stations 200 and 205. Establishing communication through both base station 200 and 205 improves the overall reliability of the system even if the communication link with a remote unit within region 175A to base station 205 is not reliable alone to support communication. Beyond boundary 180, the signal levels from base station 205 are insufficient to support communication with remote unit 155 even in soft handoff. Beyond boundary 190, the signal levels from base station 200 are insufficient to support communication with remote unit 155 even in soft handoff.

Note that FIGS. 3A and 3B are drawn with reference to each other. The reference numerals used to designate boundaries 180, 182, 184, 186, 188, and 190 increase in value with increasing distance from base station 150 and base station 200. As such, the soft handoff region between boundaries 180 and 190 is the widest region. The FM coverage area overlap region between boundaries 182 and 188 lies within the CDMA soft handoff region.

The CDMA 'hard handoff' region is the most narrow region between boundaries 184 and 186.

Note that if base station 200 belongs to a first system and base station 205 belongs to a second system, base station 200 and base station 205 may not be capable of simultaneous communication with remote unit 155. Thus, if communication needs to be transferred from base station 200 to base station 205, a hard handoff from base station 200 to base station 205 needs to be executed. Note that the remote unit must be located in the CDMA hard handoff region between boundaries 184 and 186 in region 170 for the hard handoff to have a high probability of success. The difficulty lies in the fact that hard handoff region 170 can be severely narrow and the time it takes for remote unit 155 to move into and out of hard handoff region 170 can be very short. In addition, it is difficult to discern whether remote unit 155 is within hard handoff region 170. Once it has been determined that remote unit 155 is in the hard handoff region 170, a decision must be made whether, to which base station, and when the hard handoff should occur. The present invention seeks to avoid these difficulties using collocated base stations to effect hard handoff.

Figure 4:
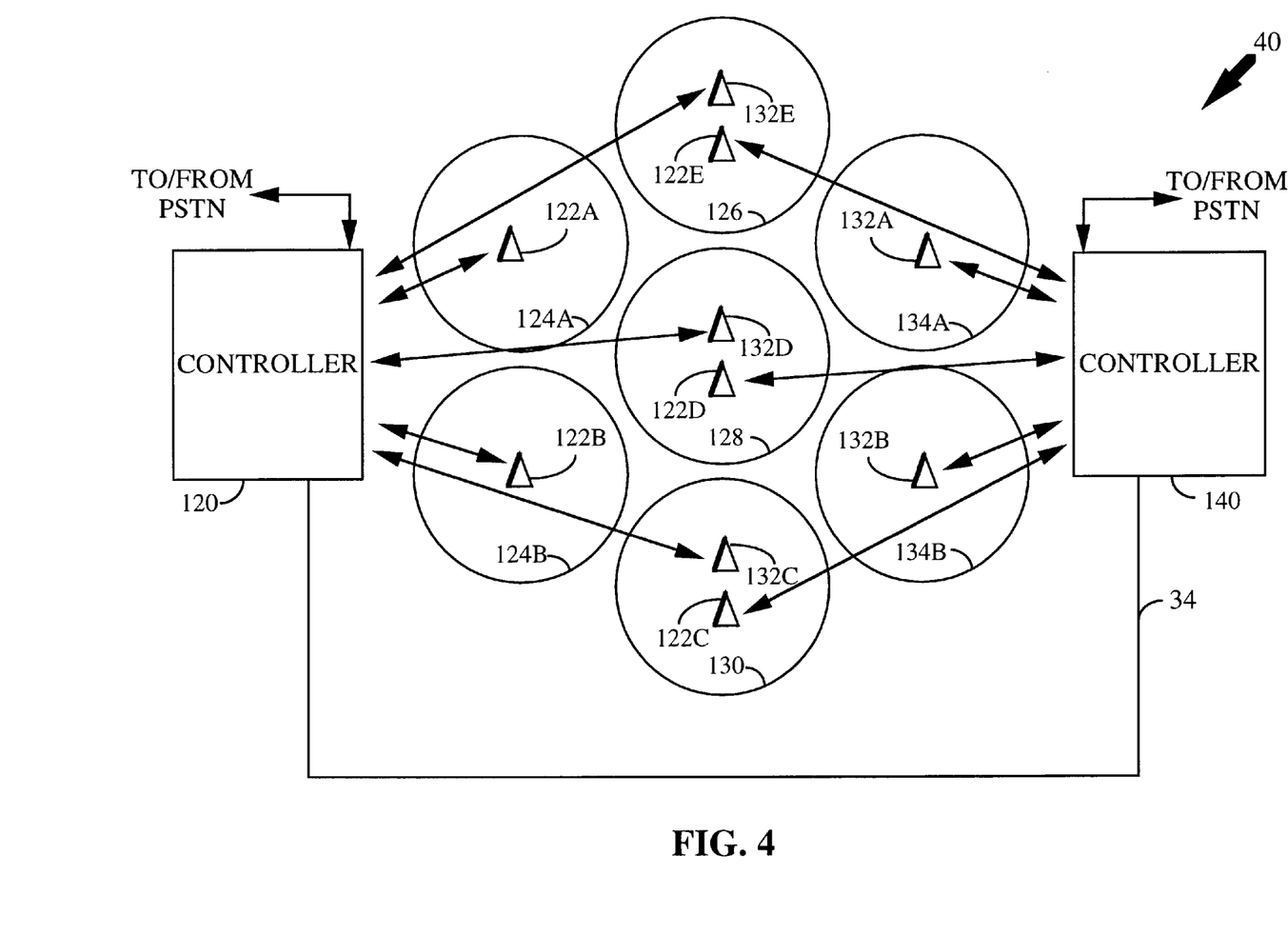
FIG. 4 depicts a cellular communications network in which a set of border coverage areas each include a first and second co-located base station respectively associated with a first and second cellular system.

Referring to FIG. 4, there is shown a cellular communications network 40 in which are included first and second cellular systems under the control of controllers 120 and 140. In FIG. 4, base stations 122C–122E of the first system and base stations 132C–132E of the second system are respectively co-located within border coverage areas 126, 128 and 130. Network 40 also comprises base stations 122A–122B controlled by controller 120 and providing coverage areas 124A and 124B respectively and base stations 132A–132B controlled by controller 140 and providing coverage areas 134A and 134B respectively. Because coverage areas 126, 128 and 130 each comprises base stations under the control of both controllers 120 and 140, network 40 provides sufficient signal strength to allow an intersystem hard handoff to be made anywhere within coverage areas 126, 128 and 130. In the preferred embodiment, the base stations may actually share certain equipment. For example, the base stations may use the same antenna, receive low-noise amplifier (LNA), transmit power amplifier, frequency up/downconverter, and IF subsystem. In addition, certain channel units (i.e., modems) used in baseband digital processing may be used by both collocated base stations.

In the preferred embodiment, the collocated base stations share a common set of receive and transmit antennas. Two advantages are gained by sharing a common set of antennas. Sharing antennas ensures that the coverage area corresponding to each base station is substantially the same. Sharing antennas also ensures that the fading experienced by the remote unit is the same for both base stations. The correlated fading of the signal from each base station is important in that ensures that the signal to interference ratio experienced by remote unit serviced by the passage-providing base station remains constant even in the presence of fading. If the fading of the signal from each base station is not correlated, the communication link between the passage-providing base station and a remote unit may be jeopardized if the signal fades with respect to the passage-providing base station and but not with respect to the service-providing base station.

Each of base stations 122C–122E and base stations 132C–132E transmit on a common frequency using pilot signals offset by a predetermined amount just as they would if the two base stations were not collocated. The disadvantage of this arrangement is that the transmissions from each of base stations 122C–122E interfere respectively with the transmissions from each of base stations 132C–132E and, therefore, a remote unit located within one of coverage areas 126, 128 and 130 is subject to heightened interference. The present invention seeks to provide a method and apparatus for same frequency hard handoff between collocated base stations without the unwanted side effect of increase interference.

The premise of the present invention is that each of the two collocated base stations is assigned a status as either the service-providing base station or the passage-providing base station. The service-providing base station provides service to the majority of remote units operating within the corresponding coverage area. The passage-providing base station is used to provide soft handoff capabilities into the coverage area from the neighboring base stations which are controlled by the same system controller as the passage-providing base station.

Figure 5:
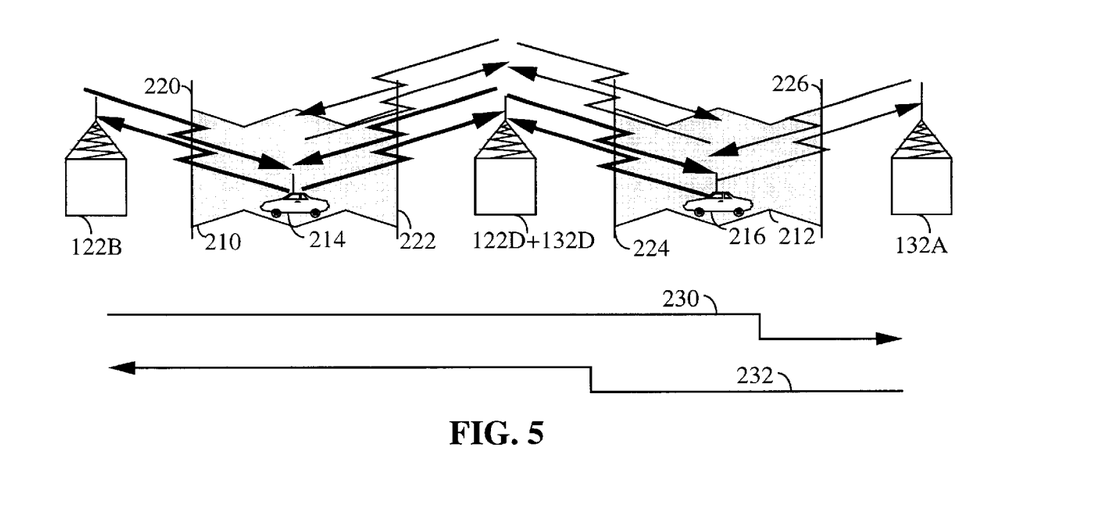
FIG. 5. depicts base stations from two different systems and is used to illustrate the handoffs which occur as a remote unit moves between coverage areas of the various base stations.

FIG. 5. shows a "side view" of base stations 122B, 122D, 132D, and 132A shown in FIG. 4. FIG. 5 is used to illustrate the handoffs which occur as a remote unit moves between coverage area 134A and coverage area of 128 and coverage area 124B, each also shown in FIG. 4. Base station 122B provides signals as directed by controller 120 as indicated with thick arrows. Base station 122D provides signals as directed by controller 120 as indicated with thick arrows. Base station 132D provides signals as directed by controller 140 as indicated with thin arrows. Base station 132A provides signals as directed by controller 140 as indicated with thin arrows.

In this case, base station 122D has been designated the service-providing base station and base station 132D has been designated as the passage-providing base station. In FIG. 5 two soft handoff regions are designated. Region 210 shows the region in which soft handoff is possible between base stations 122B and 122D. Beyond boundary 222, the signal levels from base station 122B are insufficient to support communication even in soft handoff. Beyond boundary 220, the signal levels from base station 122D are insufficient to support communication even in soft handoff. Region 212 shows the region in which soft handoff is possible between base stations 132D and 132A. Beyond boundary 226, the signal levels from base station 132D are insufficient to support communication even in soft handoff. Beyond boundary 224, the signal levels from base station 132A are insufficient to support communication even in soft handoff.

Transition lines 230 and 232 show the transitions from the system controlled by controller 120 to the system controlled by controller 140 where the upper level indicates that a remote unit at that location is communicating in the system controlled by controller 120 and the lower level indicates that a remote unit at that location is communicating in the system controlled by controller 140. Transition line 230 pertains to a remote unit traveling away from base station 122B and toward base station 132A while transition line 232 pertains to a remote unit traveling away from base station 132A and toward base station 122B.

When a remote unit is in the coverage area of base station 132A and enters region 212, it enters soft handoff between base station 132A and base station 132D. Note that the pilot signal from base station 122D may also be detected by the remote unit. In the preferred embodiment, base station 122D is not a member of the Neighbor Set in the remote unit when the remote unit is in communication with base station 132A because base station 122D cannot become a member of the Active Set. If base station 122D is a member of the Neighbor or Remaining Set, the remote unit, the base station or both may simply ignore the pilot signal strength information corresponding to base station 122D. As the remote unit moves further into the coverage area of base station 132D, the signal level from base station 132A falls below T_DROP and base station 132D is no longer a member of the Active Set. When this occurs, passage-providing base station 132A sends the remote unit a command to perform hard handoff to base station 122D. To perform the handoff simply requires co-ordination of the resources between controller 120 and controller 140. Because the two base stations are collocated, the decisions as to whether, to which base station, and when the hard handoff should occur are already answered. In the preferred embodiment, handoff is made when the Active Set is comprised solely of passage-providing base stations. Handoff is made to the base station or base stations collocated with the members of the Active Set. The handoff may be made at any time after the controllers have allocated resources and passed the appropriate information and preferably is made directly after such occurrence.

As noted above, in the preferred embodiment, hard handoff is performed when the Active Set is comprised solely of passage-providing base stations. Other stimulus could also be used to initiate hard handoff. For example, hard handoff could occur when the signal level for either or both of base station 122D and base station 132D exceed a threshold. Hard handoff could occur when the signal level from base station 132A falls below a threshold.

When a remote unit is in the coverage area of base station 122B and enters region 210, it enters soft handoff between base station 122D and base station 122B. Note that the pilot signal from base station 132D may also be detected by the remote unit. In the preferred embodiment, base station 132D is not a member of the Neighbor Set in the remote unit when the remote unit is in communication with base station 122B because base station 132D cannot become a member of the Active Set. If base station 132D is a member of the Neighbor or Remaining Set, the remote unit, the base station or both may simply ignore the pilot signal strength information corresponding to base station 122D. As the remote unit moves further into the coverage area of base station 132D, the signal level from base station 122B falls below T_DROP and base station 122B is no longer a member of the Active Set.

If the remote unit continues to travel toward the coverage area of base station 132A, it will eventually enter region 212. As the remote unit continues to travel toward base station 132A, before it reaches boundary 226, it must hard handoff to base station 132D. As noted above with reference to FIG. 3B, the connection between base station 122D and the remote unit becomes less reliable as it moves toward base station 132A because the signal level from base station 122D is decreasing while the interference from base station 132A is increasing. Before the connection becomes jeopardized a hard handoff from base station 122D to base station 132D is performed. After the hard handoff is performed, the remote unit may enter soft handoff between base station 132D and base station 132A.

The hard handoff to passage-providing base station 132D may occur based on a variety of stimulus. For example, even though it cannot become a member of the Active Set until after the hard handoff is made, base station 132A may become a member of the Candidate Set. As the remote unit approaches base station 132A the signal level from base station 132A exceeds T_ADD and base station 132A becomes a member of the Candidate Set. When an interior base station controlled by the controller which controls the passage-providing base station becomes a member of the Candidate Set, a hard handoff may be triggered. Hard handoff could also occur when the signal level for either or both of base station 122D and base station 132D falls below a threshold. Hard handoff could occur when the signal level from base station 132A exceeds some other threshold aside from T_ADD.

In the preferred embodiment, the handoff is made when base station 132A becomes a member of the Candidate Set. Because the two base stations are collocated, the decisions as to whether, to which base station, and when the hard handoff should occur are already answered. A handoff is made when an interior base station controlled by the controller which controls the passage-providing base station becomes a member of the Candidate Set. Handoff is made to the passage-providing base station or base stations collocated with the members of the Active Set. The hard handoff may be made at any time after the controllers have allocated resources and passed the appropriate information and preferably is made directly after such occurrence.

Several advantageous characteristics are apparent upon examining FIG. 5. Only those remote units which are entering the common coverage area from the system controlled by the controller which controls the passage-providing base station and those remote units which are about to exit the common coverage area and enter the system controlled by the controller which controls the passage-providing base station receive service through the passage-providing base station. All other remote units receive service through the service-providing base station. In FIG. 5, the size of the regions in which soft handoff is possible is greatly exaggerated as compared to the total size of the coverage areas. Thus, the amount of interference to the majority of remote unit within the common coverage area is kept to a minimum.

The another advantage is the existence of hystersis in the hard handoff process. For example, remote unit 216 is located within the hysteresis region of the hard handoff process. Without knowing the prior location history of the remote unit, one would not know whether remote unit 216 is in communication with base station 122D or base station 132D. The hysteris is important because the systems operates most efficiently when the minimum number of hard handoffs are made. The hysteris avoids the situation where a remote unit "ping-pongs" between the two systems. For example, if there were no hystersis, a remote unit may hard handoff from the passage-providing base station to the service-providing base station and immediately upon the transition be eligible to handoff back to the passage-providing base station. In this case the remote unit may undergo an unfunctional series of hard handoffs which unnecessarily burden the system.

The hystersis in the present invention presents a solution to this ping-pong situation. Note that if a remote unit follows the path of arrow 232 into the coverage area of base station 122D and base station 132D, it does not perform a handoff until it reaches the transition line indicated on arrow 232. If the remote unit reverses its path and exits the coverage area any time before it reaches the transition line, the remote unit never performs a hard handoff. If the remote unit enters the same region from the other direction, it operates according to arrow 230. Note that the remote unit does not complete a hard handoff until the remote unit reaches the hard handoff transition line on arrow 230. Therefore, if a remote unit following the path indicated by arrow 230 moves just past the transition line on arrow 230, completes a hard handoff, and then reverses its direction of travel, it is now operating in accordance with arrow 232 and does not complete another hard handoff unless it travels past the transition line indicate by arrow 232.

Also, as noted above, in the preferred embodiment, it is the addition and removal of base station entries from the Candidate and Active Sets respectively which sets the location of the transition lines on arrows 230 and 232. The threshold values T_ADD, T_TDROP and T_DROP set the point at which the entries are added to the Candidate Set and removed from the Active Set respectively. As noted above, T_ADD, T_TDROP and T_DROP are parameters stored within the remote unit and set by the base station. Therefore, in the collocated base stations the levels of T_ADD, T_TDROP and T_DROP may be manipulated to control the hysteris area. For example, the value of T_DROP may be lowered so that the probability of a pilot signal level exceeding the T_ADD threshold shortly after falling below the T_DROP is minimized.

There are many variations of the present invention which are within the scope of the present invention. For example, the present invention works well in conjunction with a sectorized base station configuration. If a sectorized configuration is used, the signal power of the passage-providing base station need only be provided in those sectors which have coverage areas which border the system boundary corresponding to the passage-providing base station.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for providing communications between a remote unit and at least one base station, wherein said at least one base station is controlled by a first mobile switching center which controls communications through a first set of base stations or by a second mobile switching center which controls communications through a second set of base stations comprising the steps of:

transmitting by a service providing base station a first pilot signal from an antenna wherein said service providing base station is controlled by said first mobile switching center;

transmitting by a passage providing base station a second pilot signal from said antenna wherein said passage providing base station is controlled by said second mobile switching center;

communicating by said remote unit simultaneously with a base station of said second set of base stations and said passage providing base station; and transmitting by said passage providing base station to said remote a command to perform a hard handoff of communication to said service providing base station when a signal quality measurement of said base station of said second set falls below a predetermined level.

2. The method of claim 1 wherein said predetermined level is a T_DROP level which initiates termination of communication between said remote unit and said base station of said second set.

3. The method of claim 1 further comprising the steps of:

communicating by said remote unit with said service providing base station after said hard handoff;

transmitting by said base station of said second set a third pilot signal;

measuring a signal quality of said third pilot signal by said remote unit; and transmitting by said service providing base station a command to perform a second hard handoff of communication to said passage providing base station when said measured signal quality of said third pilot signal by said remote unit exceeds a second predetermined level.

4. The method of claim 3 wherein said second predetermined level is a T_ADD level.

5. A method for providing communications between a remote unit and at least one base station, wherein said at least one base station is controlled by a first mobile switching center which controls communications through a first set of base stations or by a second mobile switching center which controls communications through a second set of base stations comprising the steps of:

transmitting by a service providing base station a first pilot signal from an antenna wherein said service providing base station is controlled by said first mobile switching center;

transmitting by a passage providing base station a second pilot signal from said antenna wherein said passage providing base station is controlled by said second mobile switching center;

communicating by said remote unit simultaneously with a base station of said second set of base stations and said passage providing base station; and transmitting by said passage providing base station to said remote unit a command to perform a hard handoff of communication to said service providing base station when a signal quality measurement of said first pilot signal exceeds a predetermined level.

6. A method for providing communications between a remote unit and at least one base station, wherein said at least one base station is controlled by a first mobile switching center which controls communications through a first set of base stations or by a second mobile switching center which controls communications through a second set of base stations comprising the steps of:

transmitting by a service providing base station a first pilot signal from an antenna wherein said service providing base station is controlled by said first mobile switching center;

transmitting by a passage providing base station a second pilot signal from said antenna wherein said passage providing base station is controlled by said second mobile switching center;

communicating by said remote unit simultaneously with a base station of said second set of base stations and said passage providing base station; and transmitting by said passage providing base station to said remote unit a command to perform a hard handoff of communication to said service providing base station when a signal quality measurement of said second pilot signal exceeds a predetermined level.

7. The method of claim 6 further comprising the steps of:

communicating by said remote unit with said service providing base station after said hard handoff;

transmitting by said base station of said second set a third pilot signal;

measuring a signal quality of said third pilot signal by said remote unit; and transmitting by said service providing base station a command to perform a second hard handoff of communication to said passage providing base station when said measured signal quality of said third pilot signal by said remote unit exceeds a second predetermined level.

8. The method of claim 7 wherein said second predetermined level is a T_ADD level.

9. A method for providing communications between a remote unit and at least one base station, wherein said at least one base station is controlled by a first mobile switching center which controls communications through a first set of base stations or by a second mobile switching center which controls communications through a second set of base stations comprising the steps of:

transmitting by a service providing base station a first pilot signal from an antenna wherein said service providing base station is controlled by said first mobile switching center;

transmitting by a passage providing base station a second pilot signal from said antenna wherein said passage providing base station is controlled by said second mobile switching center;

communicating by said remote unit through said service providing base station;

transmitting by a base station of said second set of base stations a third pilot signal;

measuring a signal quality of said third pilot signal by said remote unit; and transmitting by said service providing base station a command to perform a hard handoff of communication to said passage providing base station when said measured signal quality of said third pilot signal by said remote unit exceeds a predetermined level.

* * * * *